(12) United States Patent
Kitamura et al.

(10) Patent No.: US 10,304,629 B2
(45) Date of Patent: May 28, 2019

(54) MULTILAYER CERAMIC CAPACITOR

(71) Applicant: TAIYO YUDEN CO., LTD., Chuo-ku, Tokyo (JP)

(72) Inventors: Shohei Kitamura, Takasaki (JP); Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/685,917

(22) Filed: Aug. 24, 2017

(65) Prior Publication Data

US 2018/0061574 A1  Mar. 1, 2018

(30) Foreign Application Priority Data

Aug. 29, 2016 (JP) ................. 2016-166662

(51) Int. Cl.

| | |
|---|---|
| H01G 4/005 | (2006.01) |
| H01G 4/228 | (2006.01) |
| H01G 4/30 | (2006.01) |
| H01G 4/258 | (2006.01) |
| H01G 4/012 | (2006.01) |
| H01G 4/248 | (2006.01) |
| H01G 4/33 | (2006.01) |
| H01G 4/008 | (2006.01) |
| H01G 4/12 | (2006.01) |
| H01G 4/232 | (2006.01) |

(52) U.S. Cl.
CPC ............. *H01G 4/258* (2013.01); *H01G 4/012* (2013.01); *H01G 4/248* (2013.01); *H01G 4/30* (2013.01); *H01G 4/33* (2013.01); *H01G 4/008* (2013.01); *H01G 4/1227* (2013.01); *H01G 4/232* (2013.01)

(58) Field of Classification Search
CPC ........... H01G 4/228; H01G 4/30; H01G 4/005
USPC ............ 361/301.4, 306.1, 321.1, 321.2, 303, 361/306.3
See application file for complete search history.

(56) References Cited

U.S. PATENT DOCUMENTS

| | | | | |
|---|---|---|---|---|
| 7,307,829 B1* | 12/2007 | Devoe | .................... | H01G 2/065 361/303 |
| 2012/0069489 A1* | 3/2012 | Takeuchi | ............... | H01G 4/012 361/321.1 |

FOREIGN PATENT DOCUMENTS

JP        2005251940 A       9/2005

* cited by examiner

*Primary Examiner* — Eric W Thomas
*Assistant Examiner* — Arun Ramaswamy
(74) *Attorney, Agent, or Firm* — Law Office of Katsuhiro Arai (57) ABSTRACT

In an embodiment, a multilayer ceramic capacitor 10 has a first metal layer 14 having many holes 14a, and a second metal layer 15 having many holes 15a, with a clearance CL provided in between in the length direction, on the other height-direction side face of the capacitor body; the first metal layer 14 is partially covered by a third part 12c of a first external electrode 12, while the remainder is exposed; and the second metal layer 15 is partially covered by a third part 13c of a second external electrode 13, while the remainder is exposed. The multilayer ceramic capacitor can have excellent heat dissipation property.

14 Claims, 7 Drawing Sheets

| | Area ratio | Void ratio | Steady-state temperature |
|---|---|---|---|
| P1 | --- | --- | 74°C |
| P2 | 40% | 40% | 56°C |
| P3 | 45% | 40% | 52°C |
| P4 | 50% | 40% | 51°C |
| P5 | 55% | 40% | 50°C |
| P6 | 60% | 40% | 49°C |
| P7 | 65% | 40% | 48°C |
| P8 | 70% | 40% | 47°C |
| P9 | 75% | 40% | 46°C |
| P10 | 80% | 40% | 44°C |
| P11 | 85% | 40% | 42°C |
| P12 | 90% | 40% | 40°C |
| P13 | 95% | 40% | 38°C |

| | Area ratio | Void ratio | Steady-state temperature |
|---|---|---|---|
| P14 | 70% | 15% | 57°C |
| P15 | 70% | 20% | 52°C |
| P16 | 70% | 25% | 51°C |
| P17 | 70% | 30% | 50°C |
| P18 | 70% | 35% | 49°C |
| P19 | 70% | 40% | 47°C |
| P20 | 70% | 45% | 45°C |
| P21 | 70% | 50% | 43°C |
| P22 | 70% | 55% | 48°C |

MULTILAYER CERAMIC CAPACITOR

BACKGROUND

Field of the Invention

The present invention relates to a multilayer ceramic capacitor.

Description of the Related Art

A multilayer ceramic capacitor generally comprises: a capacitor body of roughly rectangular solid shape which has a capacitive part constituted by multiple internal electrode layers stacked together with dielectric layers in between; a first external electrode which continuously has, at least, a first part present on one length-direction side face of the capacitor body and a second part wrapping around onto one height-direction side face of the capacitor body, and to which parts of the multiple internal electrode layers are connected; and a second external electrode which continuously has, at least, a first part present on the other length-direction side face of the capacitor body and a second part wrapping around onto one height-direction side of the capacitor body, and to which the remainders of the multiple internal electrode layers are connected.

Incidentally, the aforementioned multilayer ceramic capacitor has a resistance component (Equivalent Series Resistance, or ESR), so if ripple current, noise current, or other alternating current flows through the multilayer ceramic capacitor, it generates heat based on this resistance component. This heat is released to the outside from the surface of the capacitor body or surface of each external electrode; however, in the case of a multilayer ceramic capacitor of particularly small size, a concern arises because sufficient heat dissipation is not expected, and the capacitance may drop or other functional problem may occur as a result.

Patent Literature 1 discloses a multilayer ceramic capacitor of which capacitor body houses heat-dissipating internal electrodes that are connected to the external electrodes. However, this multilayer ceramic capacitor is structured in such a way that increasing the length of the heat-dissipating internal electrodes decreases the capacitance, which means that, with a multilayer ceramic capacitor of particularly small size, making the heat-dissipating internal electrodes very long is difficult. In other words, it is realistically difficult, according to such multilayer ceramic capacitor, to exert enough heat dissipation action to remove the aforementioned concern.

BACKGROUND ART LITERATURES

[Patent Literature 1] Japanese Patent Laid-open No. 2005-251940

SUMMARY

An object of the present invention is to provide a multilayer ceramic capacitor having excellent heat dissipation property.

To achieve the aforementioned object, the multilayer ceramic capacitor pertaining to the present invention is a multilayer ceramic capacitor comprising: (1) a capacitor body of roughly rectangular solid shape which has a capacitive part constituted by multiple internal electrode layers stacked together with dielectric layers in between; (2) a first external electrode which continuously has, at least, a first part present on one length-direction side face of the capacitor body and a second part wrapping around onto one height-direction side face of the capacitor body, and to which some of the multiple internal electrode layers are connected; and (3) a second external electrode which continuously has, at least, a first part present on the other length-direction side face of the capacitor body and a second part wrapping around onto one height-direction side face of the capacitor body, and to which the remaining multiple internal electrode layers are connected; wherein a first metal layer having many holes and a second metal layer having many holes are provided, with a clearance in between in the length direction, on at least the other height-direction side face of the capacitor body; the first metal layer is in contact with the first external electrode while the second metal layer is in contact with the second external electrode; and the first metal layer is exposed at least partially while the second metal layer is exposed at least partially.

Any discussion of problems and solutions involved in the related art has been included in this disclosure solely for the purposes of providing a context for the present invention, and should not be taken as an admission that any or all of the discussion were known at the time the invention was made.

According to the multilayer ceramic capacitor pertaining to the present invention, excellent heat dissipation property can be demonstrated.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS 10, 10', 20, 20', 30, 30'—Multilayer ceramic capacitor, 11—Capacitor body, 11a—Capacitive part, 11a1—Internal electrode layer, 11b1—Dielectric layer, 11b—Dielectric margin part, 12—First external electrode, 12a—First part of the first external electrode, 12b—Second part of the first external electrode, 12c—Third part of the first external electrode, 12d—Fourth part of the first external electrode, 12e—Fifth part of the first external electrode, 13—Second external electrode, 13a—First part of the second external electrode, 13b—Second part of the second external electrode, 13c—Third part of the second external electrode, 13d—Fourth part of the second external electrode, 13e—Fifth part of the second external electrode, 14—First metal layer, 14a—Hole, 15—Second metal layer, 15a—Hole.

DETAILED DESCRIPTION OF EMBODIMENTS

First Embodiment

Figure 1:
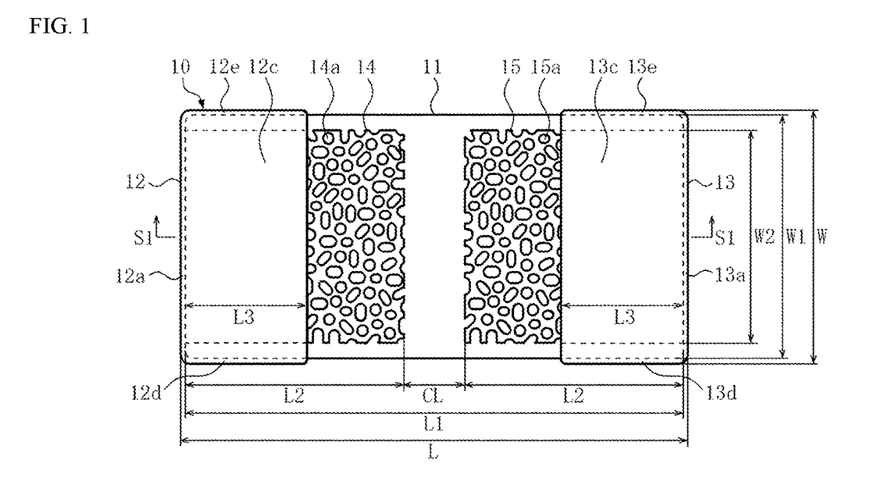
FIG. 1 is a plan view of the multilayer ceramic capacitor pertaining to the first embodiment of the present invention.
Figure 2:
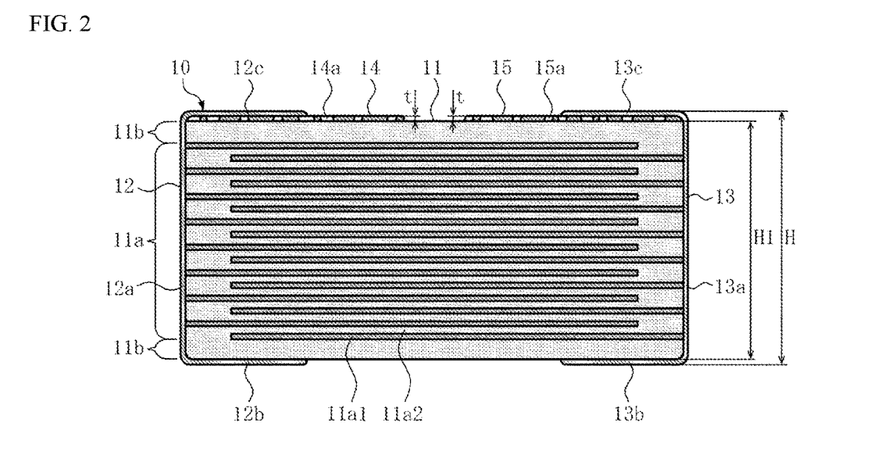
FIG. 2 is a cross-sectional view of FIG. 1 along line S1-S1.
Figure 3:
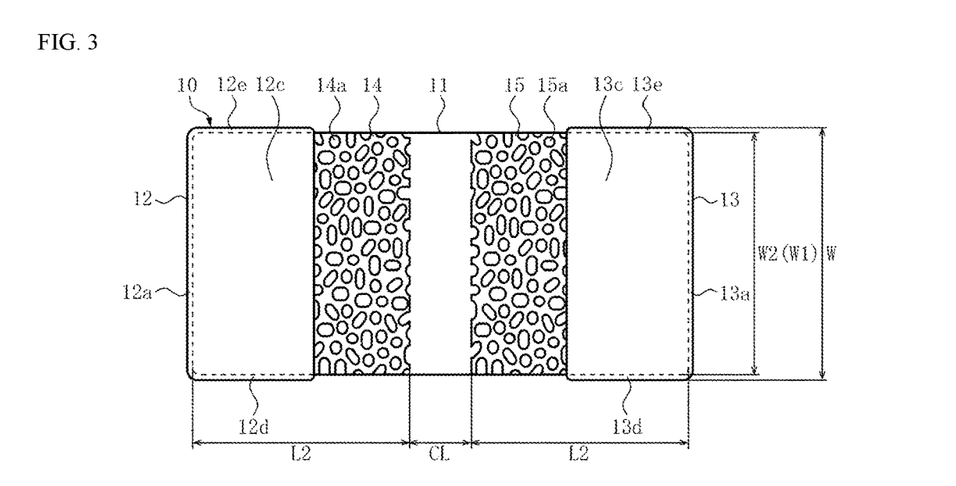
FIG. 3 is a drawing corresponding to FIG. 1, illustrating a first metal layer and a second metal layer of which widths are respectively greater than the widths of the first metal layer and the second metal layer shown in FIG. 1.

FIGS. 1 to 3 show a multilayer ceramic capacitor 10 pertaining to the first embodiment of the present invention. In the following explanations, the lateral direction in FIG. 1 is referred to as "length direction," the vertical direction in FIG. 1 is referred to as "width direction," and the vertical direction in FIG. 2 is referred to as "height direction," while the dimensions along these length direction, width direction, and height direction are referred to as "length," "width," and "height," respectively.

The size of the multilayer ceramic capacitor 10 is specified by its length L, width W, and height H. For the reference, the actual dimensions of the length L, width W, and height H of the prototype on which FIGS. 1 to 3 are based, are 2000 μm, 1250 μm, and 1250 μm, respectively. This multilayer ceramic capacitor 10 comprises a capacitor body 11, a first external electrode 12, a second external electrode 13, a first metal layer 14, and a second metal layer 15.

The capacitor body 11 has a roughly rectangular solid shape of length L1, width W1, and height H1. This capacitor body 11 has a capacitive part 11a constituted by multiple internal electrode layers 11a1 stacked together with dielectric layers 11a2 in between, and dielectric margin parts 11b provided on both height-direction sides of the capacitive part 11a. It should be noted that, while FIG. 2 depicts a total of 16 internal electrode layers 11a1 for the purpose of illustration, the number of internal electrode layers 11a1 is not limited in any way.

Each internal electrode layer 11a1 has roughly the same external shape (roughly rectangular shape) and roughly the same thickness. The length (not accompanied by symbol) of each internal electrode layer 11a1 is smaller than the length L1 of the capacitor body 11. The width (not accompanied by symbol) of each internal electrode layer 11a1 is smaller than the width W1 of the capacitor body 11. The thickness of each internal electrode layer 11a1 is set in a range of 0.3 to 3 μm, for example.

Each dielectric layer 11a2 has roughly the same external shape (roughly rectangular shape) and roughly the same thickness. The length (not accompanied by symbol) of each dielectric layer 11a2 is roughly the same as the length L1 of the capacitor body 11. The width (not accompanied by symbol) of each dielectric layer 11a2 is roughly the same as the width W1 of the capacitor body 11. The thickness of each dielectric layer 11a2 is set in a range of 0.3 to 3 μm, for example.

Each dielectric margin part 11b has roughly the same external shape (roughly rectangular shape) and roughly the same thickness. The length (not accompanied by symbol) of each dielectric margin part 11b is roughly the same as the length L1 of the capacitor body 11. The width (not accompanied by symbol) of each dielectric margin part 11b is roughly the same as the width W1 of the capacitor body 11. The thickness of each dielectric margin part 11b is set in a range of 5 to 30 μm, for example.

The primary component of each internal electrode layer 11a1 is nickel, copper, palladium, platinum, silver, gold, alloy thereof, or other metal material, for example. Also, the primary component of each dielectric layer 11a2 and that of each dielectric margin part 11b, or specifically the primary component of the capacitor body 11 excluding the internal electrode layers 11a1, is barium titanate, strontium titanate, calcium titanate, magnesium titanate, calcium zirconate, calcium zirconate titanate, barium zirconate, titanium oxide, or other dielectric material (dielectric ceramic material), for example.

The first metal layer 14 and the second metal layer 15 are provided, with a clearance CL in between in the length direction, on the other height-direction side face (top face in FIG. 2) of the capacitor body 11. The first metal layer 14 extends from one length-direction end (left end in FIG. 2) of the other height-direction side face of the capacitor body 11, to one length-direction end (left end in FIG. 2) of the clearance CL. The second metal layer 15 extends from the other length-direction end (right end in FIG. 2) of the other height-direction side face of the capacitor body 11, to the other length-direction end (right end in FIG. 2) of the clearance CL.

Each of the metal layers 14 and 15 has roughly the same external shape (roughly rectangular shape) and roughly the same thickness. The length L2 of each of the metal layers 14 and 15 is smaller than one-half the length L1 of the capacitor body 11. The width W2 of each of the metal layers 14 and 15 may be smaller than the width W1 of the capacitor body 11, as shown in FIG. 1, or it may be roughly the same as the width W1 of the capacitor body 11, as shown in FIG. 3. The length L2 of each of the metal layers 14 and 15 is set so that double this value (2×L2) falls in a range of 60 to 95% of the length L1 of the capacitor body 11, for example. Also, the width W2 of each of the metal layers 14 and 15 is set in a range of 75 to 100% of the width W2 of the capacitor body 11, for example. In other words, the sum of the area of the first metal layer 14 and that of the second metal layer 15 (2×L2×W2) is set in a range of 45 to 95% of the area of the other height-direction side face of the capacitor body 11 (L1×W1), for example. The thickness t of each of the metal layers 14 and 15 is set in a range of 0.5 to 3 µm, for example.

The metal layers 14 and 15 have many holes 14a and 15a, respectively. It should be noted that, while FIG. 2 depicts the many holes 14a and 15a that penetrate through to the other side in the thickness direction for the purpose of illustration, the many holes 14a and 15a may include holes that do not penetrate through to the other side in the thickness direction (concave parts). The many holes 14a and 15a do not have a uniform size or internal shape, and they are not arranged regularly. In other words, the metal layers 14 and 15 have the many holes 14a and 15a of varying sizes and internal shapes that are arranged irregularly. The void ratio of the first metal layer 14 and that of the second metal layer 15 are set in a range of 20 to 50%, for example.

The primary component of each of the metal layers 14 and 15 is nickel, copper, palladium, platinum, silver, gold, alloy thereof, or other metal material, for example. Each of the metal layers 14 and 15 may have an oxide film on its surface, but it inevitably has conductivity arising from the fact that it is a sintered metal. In other words, the clearance CL provided between the first metal layer 14 and the second metal layer 15 serves to prevent the first metal layer 14 and the second metal layer 15 from shorting with each other.

The first external electrode 12 continuously has a first part 12a present on and in contact with one length-direction side face (left face in FIG. 2) of the capacitor body 11, a second part 12b wrapping around onto one height-direction side face (bottom side in FIG. 2) of the capacitor body 11, a third part 12c wrapping around onto the other height-direction side face (top side in FIG. 2) of the capacitor body 11, a fourth part 12d wrapping around onto one width-direction side (bottom side in FIG. 1) of the capacitor body 11, and a fifth part 12e wrapping around onto the other width-direction side face (top side in FIG. 1) of the capacitor body 11. The second part 12b, the third part 12c, the fourth part 12d, and the fifth part 12e have roughly the same length (L3). This length L3 is set in a range of 15 to 35% of the length L1 of the capacitor body 11, for example, and is smaller than the length L2 of the first metal layer 14.

The first metal layer 14 is partially covered by and in contact with the third part 12c of the first external electrode 12, and the remainder of the first metal layer 14 not covered by the third part 12c is exposed. The exposed area of the first metal layer 14 is set in a range of 30 to 60% of the area of the first metal layer 14 (L2×W2), for example. If the width W2 of the first metal layer 14 is smaller than the width W1 of the capacitor body 11, both width-direction sides of the third part 12c of the first external electrode 12 are in contact with the surface of the capacitor body 11. Also, the second part 12b, the fourth part 12d, and the fifth part 12e of the first external electrode 12 are in contact with the surface of the capacitor body 11.

The second external electrode 13 continuously has a first part 13a present on and in contact with the other length-direction side face (right face in FIG. 2) of the capacitor body 11, a second part 13b wrapping around onto one height-direction side face (bottom side in FIG. 2) of the capacitor body 11, a third part 13c wrapping around onto the other height-direction side face (top side in FIG. 2) of the capacitor body 11, a fourth part 13d wrapping around onto one width-direction side (bottom side in FIG. 1) of the capacitor body 11, and a fifth part 13e wrapping around onto the other width-direction side face (top side in FIG. 1) of the capacitor body 11. The second part 13b, the third part 13c, the fourth part 13d, and the fifth part 13e have roughly the same length (L3). This length L3 is set in a range of 15 to 35% of the length L1 of the capacitor body 11, for example, and is smaller than the length L2 of the second metal layer 15.

The second metal layer 15 is partially covered by and in contact with the third part 13c of the second external electrode 13, and the remainder of the second metal layer 15 not covered by the third part 13c is exposed. The exposed area of the second metal layer 15 is set in a range of 30 to 60% of the area of the second metal layer 15 (L2×W2), for example. If the width W2 of the second metal layer 15 is smaller than the width W1 of the capacitor body 11, both width-direction sides of the third part 13c of the second external electrode 13 are in contact with the surface of the capacitor body 11. Also, the second part 13b, the fourth part 13d, and the fifth part 13e of the second external electrode 13 are in contact with the surface of the capacitor body 11.

It should be noted that, while FIG. 2 depicts each of the external electrodes 12 and 13 as having a single-layer constitution for the purpose of illustration, the layer constitution of each of the external electrodes 12 and 13 is not limited in any way. In other words, each of the external electrodes 12 and 13 may adopt, in addition to a single-layer constitution, a two-layer constitution, a three-layer constitution, a four-layer constitution, or other multilayer constitution, as deemed appropriate. The thickness of each of the external electrodes 12 and 13 varies depending on the layer constitution, but it is set in a range of 5 to 20 µm, for example.

If each of the external electrodes 12 and 13 has a single-layer constitution, a film of which primary component is tin, copper, nickel, palladium, gold, zinc, alloy thereof, or other metal material, for example, may be used. Additionally, if each of the external electrodes 12 and 13 has a two-layer constitution, a first film of which primary component is nickel, copper, palladium, platinum, silver, gold, alloy thereof, or other metal material, for example, and a second film of which primary component is tin, copper, nickel, palladium, gold, zinc, alloy thereof, or other metal material, for example, may be combined. Furthermore, if each of the external electrodes 12 and 13 has a three-layer constitution, a first film and a second film, of which primary component is nickel, copper, palladium, platinum, silver, gold, alloy thereof, or other metal material, for example, and a third film of which primary component is tin, copper, nickel, palladium, gold, zinc, alloy thereof, or other metal material, for example, may be combined. Furthermore, if each of the external electrodes 12 and 13 has a four-layer constitution, a first film, a second film, and a third film, of which primary component is nickel, copper, palladium, platinum, silver, gold, alloy thereof, or other metal material, for example, and a fourth film of which primary component is tin, copper, nickel, palladium, gold, zinc, alloy thereof, or other metal material, for example, may be combined.

Figure 4:
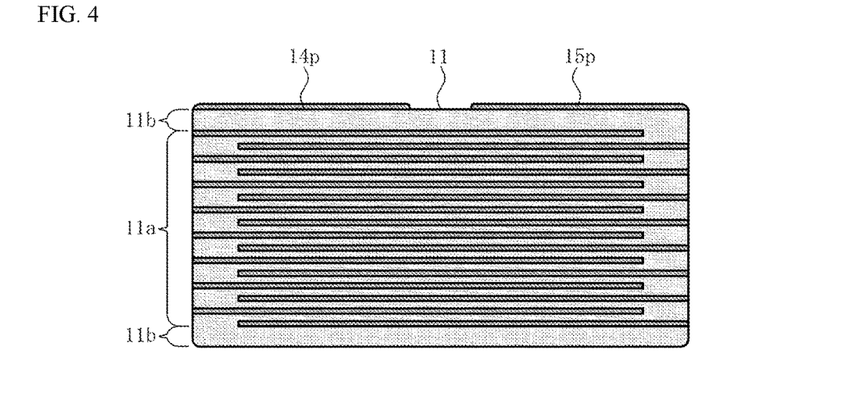
FIG. 4 is an explanatory drawing showing an example of manufacturing of the multilayer ceramic capacitor shown in FIGS. 1 to 3.
Figure 5:
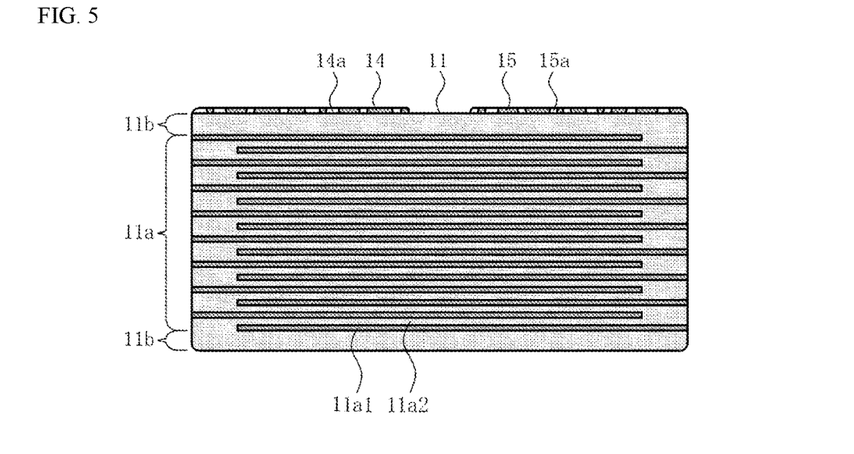
FIG. 5 is an explanatory drawing showing an example of manufacturing of the multilayer ceramic capacitor shown in FIGS. 1 to 3.

Now, an example of how the multilayer ceramic capacitor 10 is manufactured is explained using FIGS. 4 and 5 and also quoting the symbols indicated in FIGS. 1 to 3. It should be noted that the manufacturing method explained here is only an example and does not limit the manufacturing method of the multilayer ceramic capacitor 10 in any way.

If the primary component of the capacitor body 11 excluding the internal electrode layers 11a1 is barium titanate, the primary component of each internal electrode layer 11a1 is nickel, the primary component of each of the metal layers 14 and 15 is nickel, and each of the external electrodes 12 and 13 has a single-layer constitution and its primary component is nickel, then a ceramic slurry containing barium titanate powder, organic solvent, organic binder, dispersant, etc., and an electrode paste containing nickel powder, barium titanate powder (same as the above barium titanate powder), organic solvent, organic binder, dispersant, etc., are prepared first.

Next, the ceramic slurry is coated on the surface of a carrier film and then dried, to produce a first sheet having a green sheet formed on the surface of the carrier film. Also, the electrode paste is printed on the surface of the green sheet on the first sheet and then dried, to produce a second sheet having unsintered internal electrode layer patterns arranged in a matrix format or zigzag format, as formed on the surface of the green sheet. Furthermore, the electrode paste is printed on the surface of the green sheet on the first sheet and then dried, to produce a third sheet having unsintered metal layer patterns arranged in a matrix format or zigzag format, as formed on the surface of the green sheet.

Next, multiple unit sheets taken from the green sheets of the first sheets are stacked and thermally compressed together, one by one, until the number of the stacked and compressed sheets reaches a specified number, to form a section corresponding to the dielectric margin part 11b in one height direction. Next, multiple unit sheets taken from the green sheets of the second sheets (including the unsintered internal electrode layer patterns) are stacked and thermally compressed together, one by one, until the number of the stacked and compressed sheets reaches a specified number, to form a section corresponding to the capacitive part 11a. Next, multiple unit sheets taken from the green sheets of the first sheets are stacked and thermally compressed together, one by one, until the number of the stacked and compressed sheets reaches a specified number, to form a section corresponding to the dielectric margin part 11b in the other height direction. Next, multiple unit sheets taken from the green sheets of the third sheets (including the unsintered metal layer patterns) are stacked and thermally compressed together, one by one, to form a section corresponding to each of the metal layers 14 and 15. Lastly, the entire sheets are thermally compressed to produce an unsintered multilayer sheet (refer to FIG. 4). It should be noted that, while FIG. 4 depicts an unsintered multilayer sheet corresponding to one piece of the multilayer ceramic capacitor 10 for the purpose of illustration, the actual unsintered multilayer sheet is sized in such a way that multiple multilayer ceramic capacitors can be taken from it.

Next, the unsintered multilayer sheet that has been sized in such a way that multiple multilayer ceramic capacitors can be taken from it, is cut into a grid, to produce unsintered capacitor bodies, each having unsintered metal layer patterns 14p and 15p that become the metal layers 14 and 15 (refer to FIG. 4).

Next, the multiple unsintered capacitor bodies, each corresponding to FIG. 4, are placed in a sintering oven and sintered (including a binder removal process and a sintering process) all at once in a reducing ambience according to temperature profile suitable for barium titanate and nickel, to produce multiple pieces of the capacitor body 11, each having the first metal layer 14 and the second metal layer 15 (refer to FIG. 5). If necessary, the capacitor body 11, corresponding to FIG. 5, may be oxidized again.

As is evident from FIG. 5, the unsintered metal layer patterns 14p and 15p shown in FIG. 4 are present on the surface of the unsintered capacitor body and entirely exposed, and therefore the unsintered metal layer patterns 14p and 15p turn entirely porous as a result of the sintering process, to become the first metal layer 14 having the many holes 14a and the second metal layer 15 having the many holes 15a.

Next, the electrode paste is coated on both length-direction ends of the capacitor body 11 shown in FIG. 5 by means of dip-coating, roller-coating, or other method and dried, and then the dried paste is baked, to produce the first external electrode 12 and the second external electrode 13 (refer to FIGS. 1 and 2).

The multilayer ceramic capacitor 10 has the first metal layer 14 having the many holes 14a, and the second metal layer 15 having the many holes 15a, with a clearance CL provided in between in the length direction, on the other height-direction side face (top face in FIG. 2) of the capacitor body 11. In addition, the first metal layer 14 is in contact with the first external electrode 12 and also partially exposed, while the second metal layer 15 is in contact with the second external electrode 13 and also partially exposed.

This means that, even when the multilayer ceramic capacitor 10 generates heat, the heat from the capacitor body 11 can be transmitted efficiently to each of the metal layers 14 and 15, and the heat from each internal electrode layer 11a1 can be transmitted effectively to each of the metal layers 14 and 15 through each of the external electrodes 12 and 13. Also, because each of the metal layers 14 and 15 has the many holes 14a and 15a, respectively, the heat that has been transmitted to each of the metal layers 14 and 15 can be released to the outside over a wide area including the interior faces of the holes 14a or 15a. Furthermore, even when each of the metal layers 14 and 15 is partially covered by the third part 12c or 13c of each of the external electrodes 12 and 13, a portion of the heat that has been transmitted to each of the metal layers 14 and 15 can be released to the outside through the third part 12c or 13c. Furthermore, if air flows around the multilayer ceramic capacitor 10 that has been mounted on a circuit board, the heat can be released more efficiently because the many holes 14a and 15a generate turbulent flows. Based on the above, the multilayer ceramic capacitor 10 can demonstrate excellent heat dissipation property that has not heretofore been possible.

Figure 6:
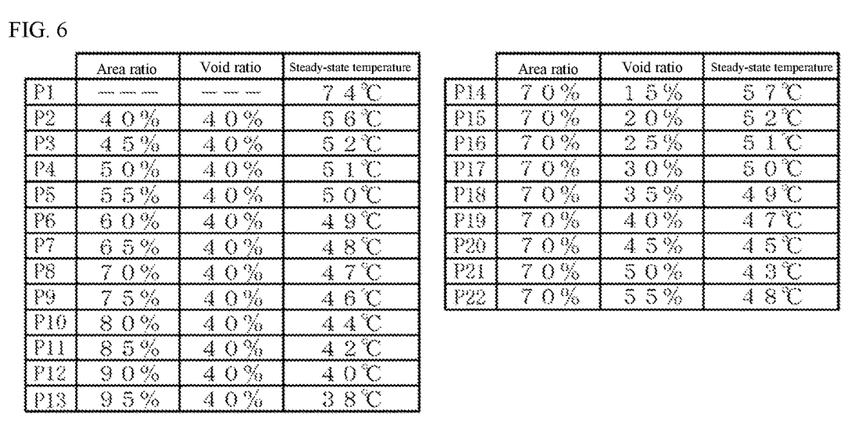
FIG. 6 is a table indicating the characteristics of the multilayer ceramic capacitor shown in FIGS. 1 to 3.

Now, the results of verifying the effect (improvement of heat dissipation property) achieved by the multilayer ceramic capacitor 10 are explained using FIG. 6 and also quoting the symbols indicated in FIGS. 1 to 3.

For the verification, the following were prepared using the multilayer ceramic capacitor 10 shown in FIGS. 1 to 3 as the base (refer to FIG. 6):

Prototype P1 having neither the first metal layer 14 nor the second metal layer 15.

Prototypes P2 to P13 of which first metal layer 14 and second metal layer 15 have the same void ratio but different area ratios.

Prototypes P14 to P22 of which first metal layer 14 and second metal layer 15 have the same area ratio but different void ratios.

With Prototypes P1 to P22, the length L is 2000 µm, the width W and height H are both 1250 µm, and the length L3 of each of the external electrodes 12 and 13 is 500 µm. It should be noted that, with Prototypes P2 to P22 having the first metal layer 14 and the second metal layer 15, the thickness t of each of the metal layers 14 and 15 is 2 μm. Also, with Prototypes P1 to p22, the primary component of the capacitor body 11 excluding the internal electrode layers 11a1 is barium titanate; the primary component of each internal electrode layer 11a1 is nickel; the primary component of each of the metal layers 14 and 15 is nickel; each of the external electrodes 12 and 13 has a single-layer configuration, its primary component is nickel, and the capacitance value is 4.7 μF. It should be noted that Prototypes P2 to P22 were produced by a method according to the example of manufacturing method explained earlier, while Prototype P1 was produced according to the example of manufacturing method explained earlier, except that the step to produce each of the metal layers 14 and 15 was eliminated.

The area ratios in FIG. 6 represent the results of {Sum of the area of the first metal layer 14 and that of the second metal layer 15 (2×L2×W2)}/{Area of the other height-direction side face of the capacitor body 11 (L1×W1)}×100 (%) for Prototypes P2 to P22, respectively. It should be noted that, with Prototypes P2 to P13 having different area ratios, the width W2 of each of the metal layers 14 and 15 was changed, by keeping the clearance CL constant (100 μm), to change the area ratio for each prototype.

The void ratios in FIG. 6 represent the void ratios of the metal layers 14 and 15 for Prototypes P2 to P22, respectively. It should be noted that, with each of Prototypes P14 to P22 having different void ratios, the amount of organic binder in the electrode paste was changed, to change the void ratio for each prototype. Here, the term "void ratio," when each of the metal layers 14 and 15 is viewed from the other height-direction side (top side in FIG. 2) of the capacitor body 11, refers to the ratio of the total area of the many holes 14a or 15a to the total area of the metal layer 14 or 15. This ratio (void ratio) was obtained by capturing an image of each of the metal layers 14 and 15 from the other height-direction side (top side in FIG. 2) of the capacitor body 11, and then processing the image based on the difference in contrast between the part which has holes and the part which does not have holes. It should be noted that, even when the many holes 14a and 15a have concave parts that do not penetrate through to the other side, the total ratio (void ratio) can still be obtained by means of image processing similar to the one described above, based on the difference in contrast between the part which has a concave part and the part which does not have a concave part.

The steady-state temperatures in FIG. 6 represent the highest temperatures manifesting at the center surfaces of Prototypes P1 to P22, respectively, measured by applying an alternating-current voltage of 50 V at 500 MHz to each prototype under the condition of 25° C. in room temperature, and then checking, on an infrared image taken by an infrared temperature measuring machine (model number; R300SR) manufactured by Nippon Avionics, the temperature of the center surface on one width-direction side face or the other width-direction side face of the capacitor body 11 in a state where the temperature stopped rising and became stable or in a steady state. This "steady-state temperature" relates to the temperature rise that occurs when the aforementioned alternating-current voltage is applied to each of Prototypes P1 to P22, and this temperature rise relates to the heat dissipation property of each of Prototypes P1 to P22. In other words, how the heat dissipation properties of Prototypes P1 to P22 are different can be understood using the steady-state temperatures in FIG. 6.

As is evident from Prototype P1 and Prototypes P2 to P13 on the left side of FIG. 6, the steady-state temperatures of Prototypes P2 to P13 having the first metal layer 14 and the second metal layer 15 are far lower than the steady-state temperature of Prototype P1 having neither the first metal layer 14 nor the second metal layer 15. In other words, the heat dissipation properties of Prototypes P2 to P13 are far superior to the heat dissipation property of Prototype P1. Also, among Prototypes P2 to P13 having different area ratios, the steady-state temperature gradually decreased in temperature steps of 1° C. or 2° C. as the area ratio increased in the case of Prototypes P3 to P13; on the other hand, the steady-state temperature of Prototype P2 differed from the steady-state temperature of Prototype P3 by 4° C. It should be noted that, while the clearance CL must be decreased in order to increase the area ratio beyond 95%, doing so increases the concern that the first metal layer 14 and the second metal layer 15 may contact each other due to manufacturing tolerance, etc., as confirmed in the production stage of prototypes. This means that, in light of the above, the area ratios that ensure easy handling in practical settings fall in a range of 45 to 95%.

As is evident from Prototype P1 on the left side of FIG. 6 and Prototypes P14 to P22 on the right side of FIG. 6, the steady-state temperatures of Prototypes P14 to P22 having the first metal layer 14 and the second metal layer 15 is far lower than the steady-state temperature of Prototype P1 having neither of the first metal layer 14 nor the second metal layer 15. In other words, the heat dissipation properties of Prototypes P14 to P22 are far superior to the heat dissipation property of Prototype P1. Also, among Prototypes P14 to P22 having different void ratios, the steady-state temperature gradually decreased in temperature steps of 1° C. or 2° C. as the void ratio increased in the case of Prototypes P15 to P21; on the other hand, the steady-state temperature of Prototype P14 differed from the steady-state temperature of Prototype P15 by 5° C., while the steady-state temperature of Prototype P22 differed from the steady-state temperature of Prototype P21 by 5° C. and was also higher than the steady-state temperature of Prototype P21. This means that, in light of the above, the void ratios that ensure easy handling in practical settings fall in a range of 20 to 50%.

Figure 7:
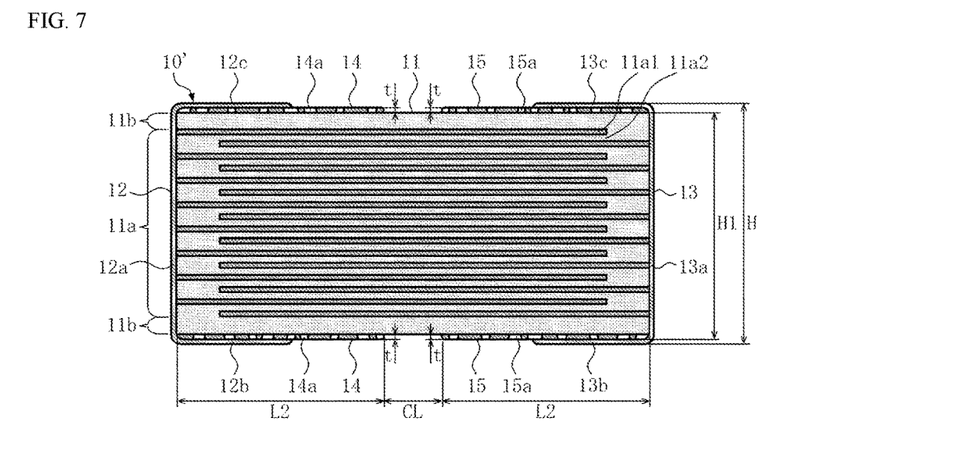
FIG. 7 is a drawing corresponding to FIG. 2, illustrating an example of variation of the multilayer ceramic capacitor shown in FIGS. 1 to 3.

Example of Variation of First Embodiment (1) The multilayer ceramic capacitor 10 shown in FIGS. 1 to 3 has the first metal layer 14 and the second metal layer 15 provided only on the other height-direction side face (top face in FIG. 2) of the capacitor body 11; however, as shown in FIG. 7, a multilayer ceramic capacitor 10' having the first metal layer 14 and the second metal layer 15 provided in a similar manner on one height-direction side face (bottom face in FIG. 7) of the capacitor body 11, in addition to the other height-direction side face (top face in FIG. 7), may be constituted.

The first metal layer 14 provided on one height-direction side face (bottom face in FIG. 7) of the capacitor body 11 is partially covered by and in contact with the second part 12b of the first external electrode 12, while the remainder of the first metal layer 14 not covered by the second part 12b is exposed. Also, the second metal layer 15 provided on one height-direction side face (bottom face in FIG. 7) of the capacitor body 11 is partially covered by and in contact with the second part 13b of the second external electrode 13, while the remainder of the second metal layer 15 not covered by the second part 13b is exposed.

According to the multilayer ceramic capacitor 10', the first metal layer 14 and the second metal layer 15 are provided not only on the other height-direction side face, but also on one height-direction side face, of the capacitor body 11, and therefore the heat dissipation action of each of the metal layers 14 and 15 can be exerted effectively to demonstrate superior heat dissipation property.

(2) The multilayer ceramic capacitors 10 and 10' shown in FIGS. 1 to 3 and FIG. 7, respectively, are based on a prototype of which length L is 2000μ and width W and height H are both 1250 μm; however, effects similar to those described above can be achieved even when the length L, width W and height H are different from the above values, and even when these dimensions have a relation other than "L>W=H," such as "L>W>H," "L>H>W," "W>L=H," "W>L>H," or "W>H>L."

Second Embodiment

Figure 8:
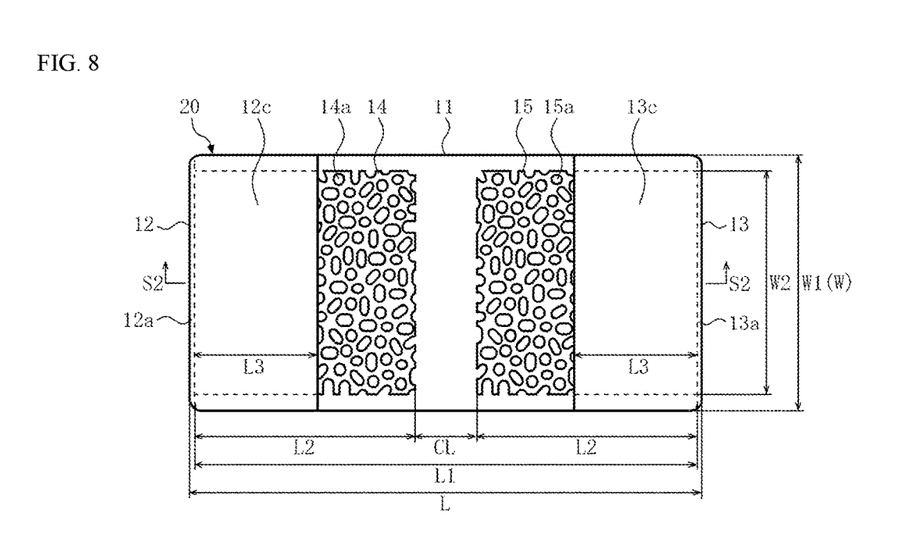
FIG. 8 is a plan view of the multilayer ceramic capacitor pertaining to the second embodiment of the present invention.
Figure 9:
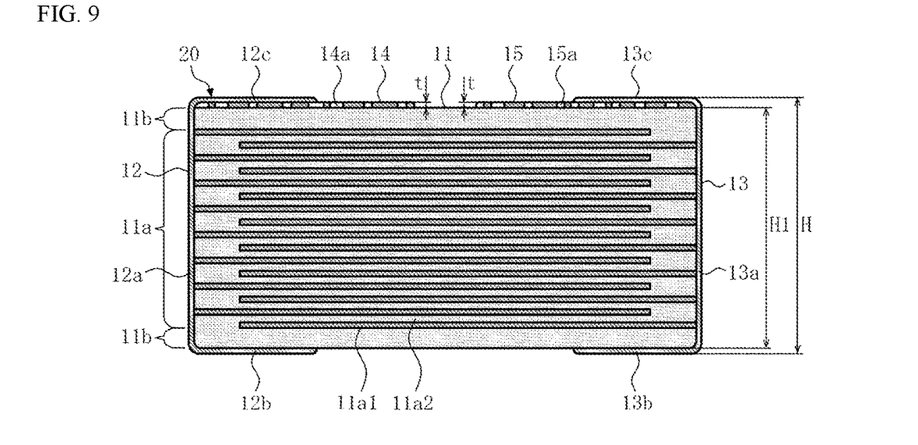
FIG. 9 is a cross-sectional view of FIG. 8 along line S2-S2.
Figure 10:
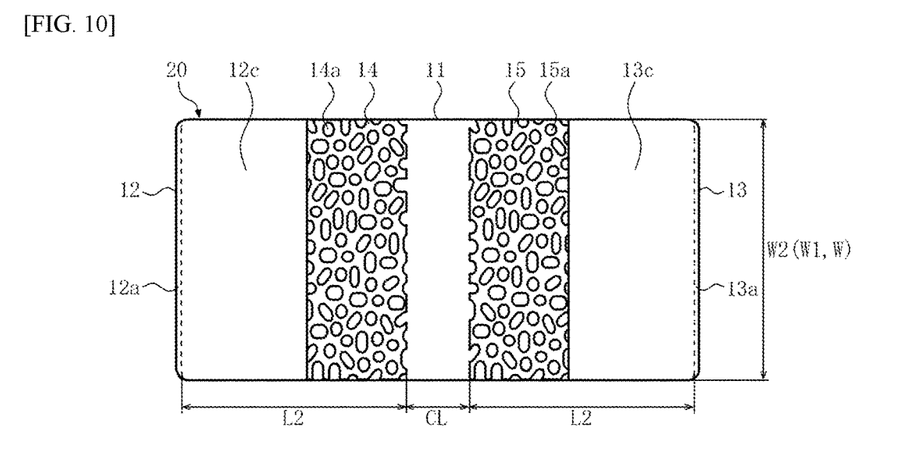
FIG. 10 is a drawing corresponding to FIG. 8, illustrating a first metal layer and a second metal layer of which widths are respectively greater than the widths of the first metal layer and the second metal layer shown in FIG. 8.

FIGS. 8 to 10 show a multilayer ceramic capacitor 20 pertaining to the second embodiment of the present invention. In the following explanations, the lateral direction in FIG. 8 is referred to as "length direction," the vertical direction in FIG. 8 is referred to as "width direction," and the vertical direction in FIG. 9 is referred to as "height direction," while the dimensions along these length direction, width direction, and height direction are referred to as "length," "width," and "height," respectively.

The multilayer ceramic capacitor 20 is structurally different from the aforementioned multilayer ceramic capacitor 10 (refer to FIGS. 1 to 3) in that it uses the first external electrode 12 having neither the fourth part 12d nor the fifth part 12e, as well as the second external electrode 13 having neither the fourth part 13d nor the fifth part 13e. Other constitutions are the same as those of the aforementioned multilayer ceramic capacitor 10 and therefore denoted using the same symbols and not explained.

More specifically, the first external electrode 12 continuously has the first part 12a present on and in contact with one length-direction side face (left face in FIG. 9) of the capacitor body 11, the second part 12b wrapping around onto one height-direction side face (bottom side in FIG. 9) of the capacitor body 11, and the third part 12c wrapping around onto the other height-direction side face (top side in FIG. 9) of the capacitor body 11. Also, the second external electrode 13 continuously has the first part 13a present on and in contact with the other length-direction side face (right face in FIG. 9) of the capacitor body 11, the second part 13b wrapping around onto one height-direction side face (bottom side in FIG. 9) of the capacitor body 11, and the third part 13c wrapping around onto the other height-direction side face (top side in FIG. 9) of the capacitor body 11.

This multilayer ceramic capacitor 20 can also demonstrate actions and effects similar to those achieved by the aforementioned multilayer ceramic capacitor 10.

Figure 11:
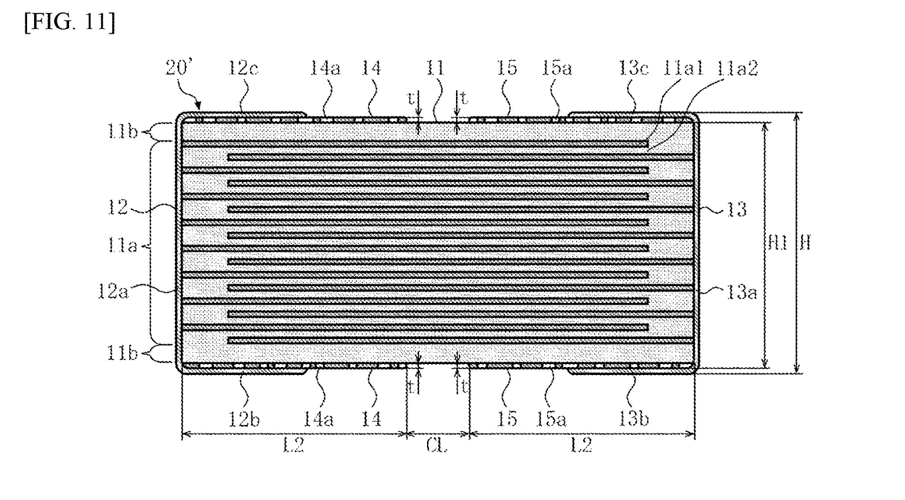
FIG. 11 is a drawing corresponding to FIG. 9, illustrating an example of variation of the multilayer ceramic capacitor shown in FIGS. 8 to 10.

Example of Variation of Second Embodiment (1) The multilayer ceramic capacitor 20 shown in FIGS. 8 to 10 has the first metal layer 14 and the second metal layer 15 provided only on the other height-direction side face (top face in FIG. 9) of the capacitor body 11; however, as shown in FIG. 11, a multilayer ceramic capacitor 20' having the first metal layer 14 and the second metal layer 15 provided in a similar manner on one height-direction side face (bottom face in FIG. 11) of the capacitor body 11, in addition to the other height-direction side face (top face in FIG. 11), may be constituted.

The first metal layer 14 provided on one height-direction side face (bottom face in FIG. 11) of the capacitor body 11 is partially covered by and in contact with the second part 12b of the first external electrode 12, while the remainder of the first metal layer 14 not covered by the second part 12b is exposed. Also, the second metal layer 15 provided on one height-direction side face (bottom face in FIG. 11) of the capacitor body 11 is partially covered by and in contact with the second part 13b of the second external electrode 13, while the remainder of the second metal layer 15 not covered by the second part 13b is exposed.

According to the multilayer ceramic capacitor 20', the first metal layer 14 and the second metal layer 15 are provided not only on the other height-direction side face, but also on one height-direction side face, of the capacitor body 11, and therefore the heat dissipation action of each of the metal layers 14 and 15 can be exerted effectively to demonstrate superior heat dissipation property.

(2) The multilayer ceramic capacitors 20 and 20' shown in FIGS. 8 to 10 and FIG. 11, respectively, are based on a prototype of which length L is 2000μ and width W and height H are both 1250 μm; however, effects similar to those described above can be achieved even when the length L, width W, and height H are different from the above values, and even when these dimensions have a relation other than "L>W=H," such as "L>W>H," "L>H>W," "W>L=H," "W>L>H," or "W>H>L."

Third Embodiment

Figure 12:
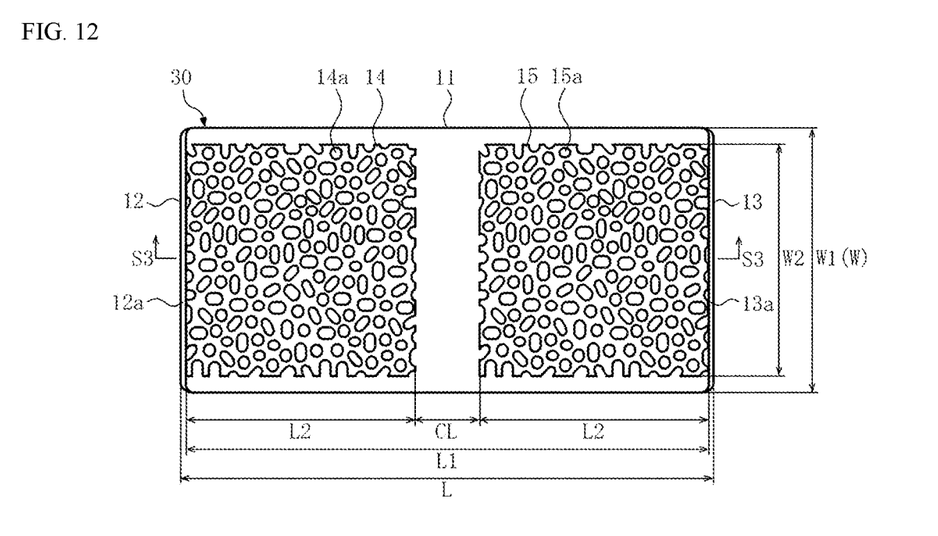
FIG. 12 is a plan view of the multilayer ceramic capacitor pertaining to the third embodiment of the present invention.
Figure 13:
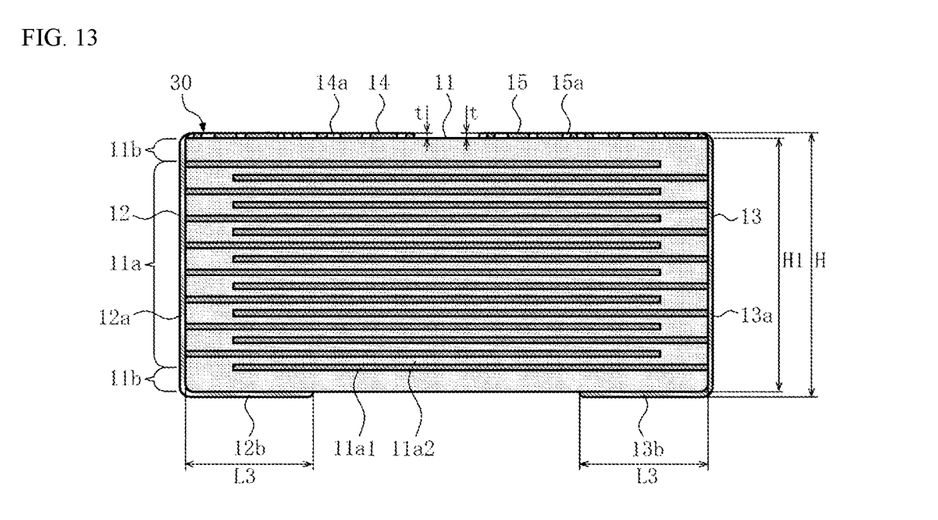
FIG. 13 is a cross-sectional view of FIG. 12 along line S3-S3.
Figure 14:
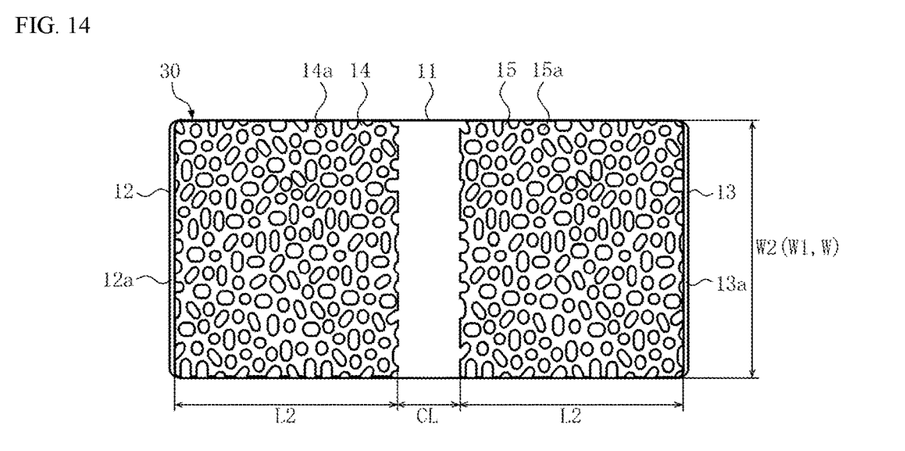
FIG. 14 is a drawing corresponding to FIG. 12, illustrating a first metal layer and a second metal layer of which widths are respectively greater than the widths of the first metal layer and the second metal layer shown in FIG. 12.

FIGS. 12 to 14 show a multilayer ceramic capacitor 30 pertaining to the third embodiment of the present invention. In the following explanations, the lateral direction in FIG. 12 is referred to as "length direction," the vertical direction in FIG. 12 is referred to as "width direction," and the vertical direction in FIG. 13 is referred to as "height direction," while the dimensions along these length direction, width direction, and height direction are referred to as "length," "width," and "height," respectively.

The multilayer ceramic capacitor 30 is structurally different from the aforementioned multilayer ceramic capacitor 10 (refer to FIGS. 1 to 3) in that it uses the first external electrode 12 having none of the third part 12c, the fourth part 12d, and the fifth part 12e, as well as the second external electrode 13 having none of the third part 13c, the fourth part 13d, and the fifth part 13e. Other constitutions are the same as those of the aforementioned multilayer ceramic capacitor 10 and therefore denoted using the same symbols and not explained.

More specifically, the first external electrode 12 continuously has the first part 12a present on and in contact with one length-direction side face (left face in FIG. 12) of the capacitor body 11, and the second part 12b wrapping around onto one height-direction side face (bottom side in FIG. 13) of the capacitor body 11. Also, the second external electrode 13 continuously has the first part 13a present on and in contact with the other length-direction side face (right face in FIG. 12) of the capacitor body 11, and the second part 13b wrapping around onto one height-direction side face (bottom side in FIG. 13) of the capacitor body 11.

The first metal layer 14 is not covered by the first external electrode 12 and thus is entirely exposed, and the other height-direction edge of the first part 12a of the first external electrode 12 is in contact with one length-direction edge of the first metal layer 14. Also, the second metal layer 15 is not covered by the second external electrode 13 and thus is entirely exposed, and the other height-direction edge of the first part 13a of the second external electrode 13 is in contact with the other length-direction edge of the second metal layer 15.

This multilayer ceramic capacitor 30 can also demonstrate actions and effects similar to those achieved by the aforementioned multilayer ceramic capacitor 10.

Figure 15:
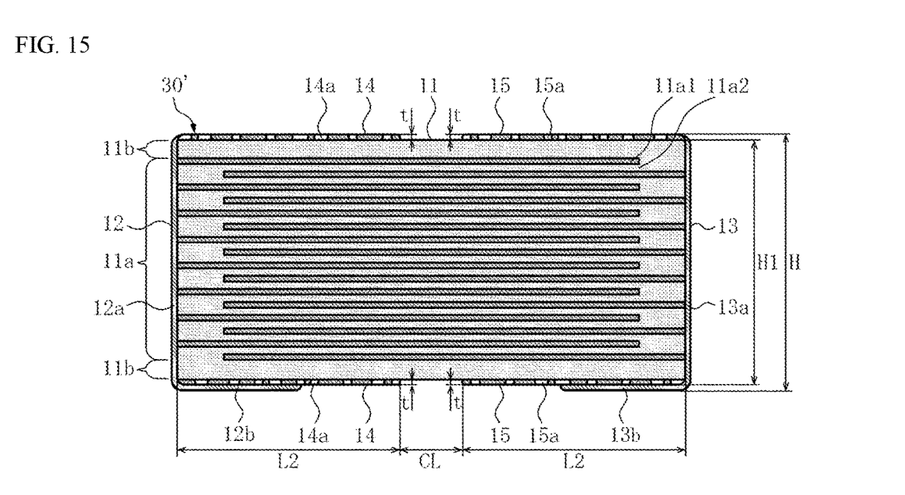
FIG. 15 is a drawing corresponding to FIG. 13, illustrating an example of variation of the multilayer ceramic capacitor shown in FIGS. 12 to 14.

Example of Variation of Third Embodiment (1) The multilayer ceramic capacitor 30 shown in FIGS. 12 to 14 has the first metal layer 14 and the second metal layer 15 provided only on the other height-direction side face (top face in FIG. 13) of the capacitor body 11; however, as shown in FIG. 15, a multilayer ceramic capacitor 30' having the first metal layer 14 and the second metal layer 15 provided in a similar manner on one height-direction side face (bottom face in FIG. 13) of the capacitor body 11, in addition to the other height-direction side face (top face in FIG. 13), may be constituted.

The first metal layer 14 provided on one height-direction side face (bottom face in FIG. 13) of the capacitor body 11 is partially covered by and in contact with the second part 12b of the first external electrode 12, while the remainder of the first metal layer 14 not covered by the second part 12b is exposed. Also, the second metal layer 15 provided on one height-direction side face (bottom face in FIG. 13) of the capacitor body 11 is partially covered by and in contact with the second part 13b of the second external electrode 13, while the remainder of the second metal layer 15 not covered by the second part 13b is exposed.

According to the multilayer ceramic capacitor 30', the first metal layer 14 and the second metal layer 15 are provided not only on the other height-direction side face, but also on one height-direction side face, of the capacitor body 11, and therefore the heat dissipation action of each of the metal layers 14 and 15 can be exerted effectively to demonstrate superior heat dissipation property.

(2) The multilayer ceramic capacitors 30 and 30' shown in FIGS. 12 to 14 and FIG. 15, respectively, are based on a prototype of which length L is 2000μ and width W and height H are both 1250 μm; however, effects similar to those described above can be achieved even when the length L, width W, and height H are different from the above values, and even when these dimensions have a relation other than "L>W=H," such as "L>W>H," "L>H>W," "W>L=H," "W>L>H," or "W>H>L."

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-166662, filed Aug. 29, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor comprising:
   (1) a capacitor body of roughly rectangular solid shape which has a capacitive part constituted by multiple internal electrode layers stacked together with dielectric layers in between;
   (2) a first external electrode which continuously has, at least, a first part present on one length-direction side face of the capacitor body and a second part wrapping around onto one height-direction side face of the capacitor body, and to which some of the multiple internal electrode layers are connected; and
   (3) a second external electrode which continuously has, at least, a first part present on another length-direction side face of the capacitor body and a second part wrapping around onto the one height-direction side face of the capacitor body, and to which the remaining multiple internal electrode layers are connected;
   wherein:
   a first metal layer having many hollow holes penetrating into or through the first metal layer in a thickness direction, and a second metal layer having many hollow holes penetrating into or through the second metal layer in a thickness direction, are provided, with a clearance in between in the length direction, on at least another height-direction side face of the capacitor body;
   the first metal layer is in contact with the first external electrode, while the second metal layer is in contact with the second external electrode; and
   the first metal layer and the second metal layer, including the respective hollow holes, are each exposed at least partially to an exterior of the multilayer ceramic capacitor as viewed from the height direction.

2. The multilayer ceramic capacitor according to claim 1, wherein the first metal layer and the second metal layer are provided only on the other height-direction side face of the capacitor body.

3. The multilayer ceramic capacitor according to claim 2, wherein:
   the first external electrode continuously has the first part present on the one length-direction side face of the capacitor body, the second part wrapping around onto the one height-direction side face of the capacitor body, a third part wrapping around onto the other height-direction side face of the capacitor body, a fourth part wrapping around onto one width-direction side face of the capacitor body, and a fifth part wrapping around onto another width-direction side face of the capacitor body;
   the second external electrode continuously has the first part present on the other length-direction side face of the capacitor body, the second part wrapping around onto the one height-direction side face of the capacitor body, a third part wrapping around onto the other height-direction side face of the capacitor body, a fourth part wrapping around onto one width-direction side face of the capacitor body, and a fifth part wrapping around onto another width-direction side face of the capacitor body;

the first metal layer is partially covered by the third part of the first external electrode, while the remainder is exposed as viewed from the orthogonal direction; and the second metal layer is partially covered by the third part of the second external electrode, while the remainder is exposed as viewed from the orthogonal direction.

4. The multilayer ceramic capacitor according to claim 2, wherein:

the first external electrode continuously has the first part present on the one length-direction side face of the capacitor body, the second part wrapping around onto the one height-direction side face of the capacitor body, and a third part wrapping around onto the other height-direction side face of the capacitor body;

the second external electrode continuously has the first part present on the other length-direction side face of the capacitor body, the second part wrapping around onto the one height-direction side face of the capacitor body, and a third part wrapping around onto the other height-direction side face of the capacitor body;

the first metal layer is partially covered by the third part of the first external electrode, while the remainder is exposed as viewed from the orthogonal direction; and the second metal layer is partially covered by the third part of the second external electrode, while the remainder is exposed as viewed from the orthogonal direction.

5. The multilayer ceramic capacitor according to claim 1, wherein an external shape of the first metal layer and that of the second metal layer are both a rectangle having a length and a width.

6. The multilayer ceramic capacitor according to claim 1, wherein a width of the first metal layer and that of the second metal layer are both smaller than a width of the capacitor body.

7. The multilayer ceramic capacitor according to claim 1, wherein a width of the first metal layer and that of the second metal layer are both equal to a width of the capacitor body.

8. The multilayer ceramic capacitor according to claim 1, wherein the sum of the area of a face of the first metal layer and that of the second metal layer in parallel to the other height-direction side face is set in a range of 45 to 95% of the area of the other height-direction side face of the capacitor body.

9. The multilayer ceramic capacitor according to claim 1, wherein a void ratio of the first metal layer and that of the second metal layer are each set in a range of 20 to 50%.

10. A multilayer ceramic capacitor comprising:

(1) a capacitor body of roughly rectangular solid shape which has a capacitive part constituted by multiple internal electrode layers stacked together with dielectric layers in between;

(2) a first external electrode which continuously has, at least, a first part present on one length-direction side face of the capacitor body and a second part wrapping around onto one height-direction side face of the capacitor body, and to which some of the multiple internal electrode layers are connected; and (3) a second external electrode which continuously has, at least, a first part present on another length-direction side face of the capacitor body and a second part wrapping around onto the one height-direction side face of the capacitor body, and to which the remaining multiple internal electrode layers are connected;

wherein:

a first metal layer having many through holes, and a second metal layer having many through holes, are provided, with a clearance in between in the length direction, on at least another height-direction side face of the capacitor body;

the first metal layer is in contact with the first external electrode, while the second metal layer is in contact with the second external electrode; and the first metal layer and the second metal layer are each exposed at least partially as viewed from an orthogonal direction, wherein:

the first metal layer and the second metal layer are provided only on the other height-direction side face of the capacitor body, the first external electrode continuously has the first part present on the one length-direction side face of the capacitor body and the second part wrapping around onto the one height-direction side face of the capacitor body;

the second external electrode continuously has the first part present on the other length-direction side face of the capacitor body and the second part wrapping around onto the one height-direction side face of the capacitor body; and the first metal layer and the second metal layer are each entirely exposed as viewed from the orthogonal direction.

11. A multilayer ceramic capacitor comprising:

(1) a capacitor body of roughly rectangular solid shape which has a capacitive part constituted by multiple internal electrode layers stacked together with dielectric layers in between;

(2) a first external electrode which continuously has, at least, a first part present on one length-direction side face of the capacitor body and a second part wrapping around onto one height-direction side face of the capacitor body, and to which some of the multiple internal electrode layers are connected; and (3) a second external electrode which continuously has, at least, a first part present on another length-direction side face of the capacitor body and a second part wrapping around onto the one height-direction side face of the capacitor body, and to which the remaining multiple internal electrode layers are connected;

wherein:

a first metal layer having many through holes, and a second metal layer having many through holes, are provided, with a clearance in between in the length direction, on at least another height-direction side face of the capacitor body;

the first metal layer is in contact with the first external electrode, while the second metal layer is in contact with the second external electrode; and the first metal layer and the second metal layer are each exposed at least partially as viewed from an orthogonal direction, wherein the first metal layer and the second metal layer are provided not only on the other height-direction side face but also the one height-direction side face of the capacitor body.

12. The multilayer ceramic capacitor according to claim 11, wherein:

the first external electrode continuously has the first part present on the one length-direction side face of the capacitor body, the second part wrapping around onto the one height-direction side face of the capacitor body, a third part wrapping around onto the other height-direction side face of the capacitor body, a fourth part wrapping around onto one width-direction side face of the capacitor body, and a fifth part wrapping around onto another width-direction side face of the capacitor body;

the second external electrode continuously has the first part present on the other length-direction side face of the capacitor body, the second part wrapping around onto the one height-direction side face of the capacitor body, a third part wrapping around onto the other height-direction side face of the capacitor body, a fourth part wrapping around onto one width-direction side face of the capacitor body, and a fifth part wrapping around onto another width-direction side face of the capacitor body;

the first metal layer provided on the other height-direction side face of the capacitor body is partially covered by the third part of the first external electrode, while the remainder is exposed as viewed from the orthogonal direction;

the second metal layer provided on the other height-direction side face of the capacitor body is partially covered by the third part of the second external electrode, while the remainder is exposed as viewed from the orthogonal direction;

the first metal layer provided on the one height-direction side face of the capacitor body is partially covered by the second part of the first external electrode, while the remainder is exposed as viewed from the orthogonal direction; and the second metal layer provided on the one height-direction side face of the capacitor body is partially covered by the second part of the second external electrode, while the remainder is exposed as viewed from the orthogonal direction.

13. The multilayer ceramic capacitor according to claim 11, wherein:

the first external electrode continuously has the first part present on the one length-direction side face of the capacitor body, the second part wrapping around onto the one height-direction side face of the capacitor body, and a third part wrapping around onto the other height-direction side face of the capacitor body;

the second external electrode continuously has the first part present on the other length-direction side face of the capacitor body, the second part wrapping around onto the one height-direction side face of the capacitor body, and a third part wrapping around onto the other height-direction side face of the capacitor body;

the first metal layer provided on the other height-direction side face of the capacitor body is partially covered by the third part of the first external electrode, while the remainder is exposed as viewed from the orthogonal direction;

the second metal layer provided on the other height-direction side face of the capacitor body is partially covered by the third part of the second external electrode, while the remainder is exposed as viewed from the orthogonal direction;

the first metal layer provided on the one height-direction side face of the capacitor body is partially covered by the second part of the first external electrode, while the remainder is exposed as viewed from the orthogonal direction; and the second metal layer provided on the one height-direction side face of the capacitor body is partially covered by the second part of the second external electrode, while the remainder is exposed as viewed from the orthogonal direction.

14. The multilayer ceramic capacitor according to claim 11, wherein:

the first external electrode continuously has the first part present on the one length-direction side face of the capacitor body and the second part wrapping around onto the one height-direction side face of the capacitor body;

the second external electrode continuously has the first part present on the other length-direction side face of the capacitor body and the second part wrapping around onto one height-direction side face of the capacitor body;

the first metal layer provided on the other height-direction side face of the capacitor body is entirely exposed as viewed from the orthogonal direction;

the second metal layer provided on the other height-direction side face of the capacitor body is entirely exposed as viewed from the orthogonal direction;

the first metal layer provided on the one height-direction side face of the capacitor body is partially covered by the second part of the first external electrode, while the remainder is exposed as viewed from the orthogonal direction; and the second metal layer provided on the one height-direction side face of the capacitor body is partially covered by the second part of the second external electrode, while the remainder is exposed as viewed from the orthogonal direction.

* * * * *